United States Patent Office 3,845,124
Patented Oct. 29, 1974

3,845,124
METHYLTRICYCLO[4.4.0.0³·⁸]DECAN-1-METHYLAMINE
Pierre Deslongchamps, Sherbrooke, Quebec, Canada, assignors to Ayerst, McKenna & Harrison, Limited, St. Laurent, Quebec, Canada
No Drawing. Continuation-in-part of application Ser. No. 743,623, July 10, 1968, now Patent No. 3,579,567. This application Jan. 27, 1969, Ser. No. 794,422
Int. Cl. C07c 87/40
U.S. Cl. 260—563 P  3 Claims

ABSTRACT OF THE DISCLOSURE

There are disclosed herein tricyclo[4.4.0.0³·⁸]decan-1-amine and α-methyltricyclo[4.4.0.0³·⁸]decan - 1 - methylamine and the intermediates used in their preparation 8-hydroxytricyclo[4.4.0.0³·⁸]decan - 4 - one acetate, 8-hydroxytricyclo[4.4.0.0³·⁸]decan-4-one acetate thioketal, tricyclo[4.4.0.0³·⁸]decan-1-ol acetate, tricyclo[4.4.0.0³·⁸] decan-1-ol, N-1-tricyclo[4.4.0.0³·⁸]decanylacetamide, tricyclo[4.4.0.0³·⁸]decane - 1 - carboxylic acid, tricyclo[4.4.0.0³·⁸]decanylmethylketone and tricyclo[4.4.0.0³·⁸] decanylmethylketone oxime. The compounds possess antiviral properties, and methods for their use as well as processes for their preparation are also disclosed.

This application is a Continuation-in-part of my U.S. Patent Application Ser. No. 743,623, filed July 10, 1968 and now U.S. Pat. No. 3,579,567 (AHP-4827).

This invention relates to the novel tricyclic amines tricyclo[4.4.0.0³·⁸]decan - 1 - amine and α-methyltricyclo-[4.4.0.0³·⁸]decan-1-methylamine, to intermediates used in their syntheses and to processes for their preparation.

Furthermore, this invention includes the non-toxic, pharmaceutically acceptable acid addition salts of tricyclo-[4.4.0.0³·⁸]decan-1-amine and α-methyltricyclo[4.4.0.0³·⁸] decan-1-methylamine. Such salts are prepared from suitable acids, such as inorganic acids, for instance, hydrochloric, hydrobromic, sulfuric, phosphoric, or sulfamic acid; or organic acids, for instance, acetic, maleic, lactic, ethanedisulfonic, glycolic, salicyclic and fumaric acids. The acid addition salts are prepared by reacting the tricyclic amines of this invention with either one equivalent of acid or preferably an excess in an organic solvent such as ether or an ethanol-ether mixture.

Tricyclo[4.4.0.0³·⁸]decan-1-amine and α-methyltricyclo-[4.4.0.0³·⁸]decan-1-methylamine, the tricyclic amines of this invention, may be represented by the formula I,

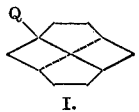

I.

in which Q represents the amino group —NH₂ or the (α-methyl) methylamino group —CH(CH₃)NH₂, respectively.

The tricyclic amines of this invention possesses useful antivirial activity. This activity is readily demonstrated in standard pharmaceutical tests, such as, for example, the tests described by R. C. Stewart in "Pharmacological Techniques in Drug Evaluation" by Year Book Medical Publishers, Inc., Volume 2, page 576. More specifically, the compound of this invention shows antivirial activity against certain strains of influenza, especially influenza A and influenza A'.

When the tricyclic amines of this invention are used as antiviral agents in warm-blooded mammals, for example, mice, they may be employed alone or in combination with pharmacologically acceptable carriers. When employed with a pharmacologically acceptable carrier, the proportion of these agents are determined by their solubility and chosen route of administration. For example the agents may be administered orally in solid form containing such excipients as starch, milk sugar, certain types of clay and so forth. Also they may be administered orally in the form of solutions or they may be injected parenterally. For parenteral administration they may be used in the form of a sterile solution containing other solutes, for example, enough saline or glucose to make the solution isotonic.

The dosage of the present therapeutic agent will vary with the form of administration. Furthermore, it will vary with the particular host under treatment. Generally, treatment is initiated with small dosages substantially less than the optimum dose of the compound. Thereafter, the dosage is increased by small increments until the optimum effect under the circumstances is reached. In general, tricyclic amines of this invention are most desirably administered at a concentration level that will generally afford effective results without causing any harmful or deleterious side effects and preferably at a level that is in a range of from about 0.5 mg. to about 100 mg. per kilo per day, although as aforementioned variations will occur. However, a dosage level that is in the range of from about 2 mg. to about 10 mg. per kilo per day is most satisfactory. Such doses may be administered once or twice a day, as required.

The tricyclic amines of this invention are prepared by processes illustrated by the following formulae:

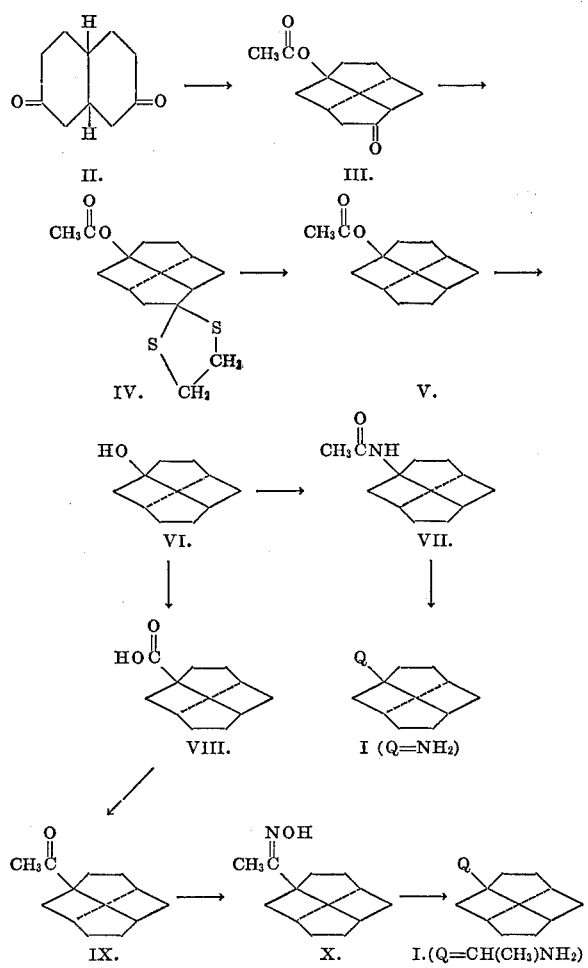

More specifically, for the preparation of tricyclo-[4.4.0.0³·⁸]decan-1-amine the process,

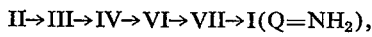

II→III→IV→VI→VII→I(Q=NH₂), is used and for the preparation of α-methyltricyclo-[4.4.0.0³·⁸]decan-1-methylamine the process,

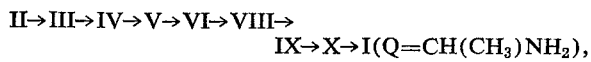

II→III→IV→V→VI→VIII→
IX→X→I(Q=CH(CH₃)NH₂), is used.

For the two processes outlined above I prefer to use as starting material the compound, decalin-2,7-dione of formula II, described by A. G. Anderson and D. O. Barlow, J. Am. Chem. Soc. 77, 5165 (1955). Treatment of the starting material (II) with a mixture of a lower alkanoic acid such as, acetic acid, a lower alkanoic anhydride, such as acetic anhydride, and boron trifluoride at room temperature affords the 8 - hydroxytricyclo[4.4.0.0³·⁸]decan-4-one acetate of formula III. The latter compound is converted to its corresponding thioketal of formula IV by treatment with ethane dithiol in a conventional manner. Desulfurization of the thioketal IV with an excess of Raney nickel in boiling ethanol for two days yields tricyclo[4.4.0.0³·⁸]decan-1-ol acetate of formula V. The latter compound is converted to its corresponding free hydroxy derivative of formula VI, tricyclo[4.4.0.0³·⁸]decan-1-ol, preferably by reductive hydrolysis with lithium aluminum hydride; alternatively, hydrolysis with a dilute acid, such as, for example, dilute hydrochloric acid, or with a dilute base, such as, for example, dilute sodium carbonate, may be used to achieve this conversion.

The process for the preparation of tricyclo[4.4.0.0³·⁸]-decan-1-amine is completed as follows: treatment of tricyclo[4.4.0.0³·⁸]decan-1-ol (VI), described above, with acetonitrile and sulfuric acid readily affords N-1-tricyclo-[4.4.0.0³·⁸]decanyl-acetamide of formula VII, which upon hydrolysis, preferably by boiling with dilute sodium hydroxide in diethylene glycol, yields the tricyclic amine of this invention, tricyclo[4.4.0.0³·⁸]decan-1-amine, of formula I(Q=NH₂).

For the preparation of the tricyclic amine of this invention, α-methyltricyclo[4.4.0.0³·⁸]decan-1-methylamine, of formula I(Q=CH(CH₃)NH₂), tricyclo[4.4.0.0³·⁸]decan-1-ol (VI), described above, is treated with formic acid in the presence of a strong mineral acid, such as, for example, sulfuric acid, to yield tricyclo[4.4.0.0³·⁹]decane-1-carboxylic acid (VIII). The latter compound is then allowed to react with methyl lithium in ether solution and after a conventional work-up, such as, quenching the reaction mixture in water, followed by separation, drying and evaporation of the ether phase, the methyl ketone (IX) is isolated. Conversion of the methyl ketone (IX) to its corresponding oxime derivative (X) using conventional methods, such as, for example, the method using hydroxylamine hydrochloride and sodium acetate, and subsequent hydrogenation, for example, catalytic hydrogenation utilizing Raney nickel in ammoniacal ethanol solution under pressure, of the resultant oxime (X) readily affords the tricyclic amine (I,Q=CH(CH₃)NH₂) of this invention.

The following Examples will illustrate this invention.

EXAMPLE 1

8-Hydroxytricyclo[4.4.0.0³·⁸]decan-4-one Acetate (III)

A solution of decalin-2,7-dione (1.0 g.) in 20 ml. of acetic acid and 8 ml. of acetic anhydride is treated with 9.6 ml. of freshly distilled boron trifluoride-ethyl ether complex and allowed to stand at room temperature for 22 hours. The reaction mixture is extracted with 40 ml. of chloroform. The chloroform extract is washed in turn with water, 5% aqueous sodium carbonate, and water, dried over magnesium sulfate, filtered and evaporated to dryness. The oily residue is subjected to chromatography on a column of 25 g. of alumina. The column is eluted with petroleum ether and 25% petroleum ether in benzene. The combined eluates are evaporated to dryness. The residual colorless oil is crystallized from petroleum ether to afford the title compound (III) as colorless crystals, m.p. 66–68° C.

EXAMPLE 2

8-Hydroxytricyclo[4.4.0.0³·⁸]decan-4-one acetate thioketal (IV)

Freshly distilled borontrifluoride-ether complex (50 ml.) is added to a solution of 4 g. of 8-hydroxytricyclo-[4.4.0.0³·⁸]decan-4-one acetate (III) and 4.0 ml. of ethane dithiol in 300 ml. of glacial acetic acid. The mixture is stirred at room temperature for 24 hours, diluted with 1.5 l. of water and extracted with ether (5×250 ml.). The ether extract is washed with dilute sodium carbonate, and then water, dried over magnesium sulfate, filtered and evaporated to dryness to afford the title compound, suitable for use in the following step (Example 3), as a crude oil, The residual crude oil is crystallized from petroleum ether to yield the pure title compound (IV), m.p. 71° C.

EXAMPLE 3

Tricyclo[4.4.0.0³·⁸]decan-1-ol acetate (V)

A solution of crude 8-hydroxytricyclo[4.4.0.0³·⁸]decan-4-one acetate thioketal (IV, 8.0 g.) in 400 ml. of absolute ethanol is treated with 7.0 g. of Raney nickel and boiled for 12 hours. During the time small portions of fresh Raney nickel are added at two hour intervals. The reaction mixture is cooled and filtered through Celite. Raney nickel (30 g.) is added to the filtered solution and the resultant mixture is boiled for 12 hours. The mixture is now cooled and filtered through Celite, diluted with water (3 l.) and extracted with pentane (4×250 ml.). The pentene extract is dried over magnesium sulfate, filtered, and evaporated to dryness yielding the title compound (V) as a colourless oil, b.p. 80–82° C./0.4–0.5 mm.

EXAMPLE 4

Tricyclo[4.4.0.0³·⁸]decan-1-ol (VI)

A mixture of tricyclo[4.4.0.0³·⁸]decan-1-ol acetate (V, 200 mg.) and lithium aluminum hydride (200 mg.) in 25 ml. of ether is stirred and boiled for six hours. Excess lithium aluminum hydride is decomposed by the careful dropwise addition of water. After addition of magnesium sulfate, the reaction mixture is filtered. The filtrate is evaporated to dryness to yield the title compound (VI) which is purified by crystallization from petroleum ether to m.p. 215° C.

EXAMPLE 5

N-1-tricyclo[4.4.0.0³·⁸]decanylacetamide (VII)

Tricyclo[4.4.0.0³·⁸]decan-1-ol (VI, 579 mg.) is dissolved in 10 ml. of acetonitrile, cooled in an ice bath, stirred and treated dropwise with a cold solution of 3.8 ml. of sulfuric acid in 10 ml. of acetonitrile over a period of 30 minutes. After standing at room temperature for 12 hours, the reaction mixture is cooled in an ice bath and a solution of sodium hydroxide (6 g. in 20 ml. of water) is added slowly. A small amount of water is added to dissolve the resulting sodium sulfate precipitate. The mixture is extracted with ether (6×40 ml.). The ether extract is washed once with brine, dried over magnesium sulfate, filtered and evaporated to dryness. The crystalline residue is recrystallized from petroleum ether to afford the pure title compound (VII), m.p. 129–131° C.

EXAMPLE 6

Tricyclo[4.4.0.0³·⁸]decan-1-amine (I,Q=NH₂)

N - 1 - Tricyclo[4.4.0.0³·⁸]decanylacetamide (VII, 522 mg.) is dissolved in 10 ml. of warm diethylene glycol. Sodium hydroxide (1.0 g.) is added to the solution at room temperature. The mixture is refluxed (oil bath temperature, 240–250° C.) under nitrogen for four hours. After cooling, the mixture is treated with 40 ml. of brine and then extracted with ether (8×30 ml.). The ether extract is dried over magnesium sulfate, filtered and evaporatd to dryness to yield the title compound (I) as an oil which slowly solidified. A portion of this crude product is sublimed to give the pure title compound, m.p. 184–185° C., $\gamma_{max.}^{NaCl}$ 3300 and 1600 cm.$^{-1}$.

The hydrochloride salt of the title compound is prepared by treating a solution of the above crude product in ether with excess dry hydrogen chloride. The resulting precipitate is collected and recrystallized from methanol-ether (1:60) to give tricyclo[4.4.0.0$^{3.8}$]decan-1-amine hydrochloride, m.p. above 360° C.

EXAMPLE 7

Tricyclo[4.4.0.0$^{3.8}$]decane-1-carboxylic acid (VIII)

A solution of tricyclo[4.4.0.0$^{3.8}$]decan-1-ol, prepared as described in Example 4, (VI, 60 mg.) and 97% formic acid (0.2 ml.) in one ml of hexane is slowly added to concentrated sulfuric acid (2 ml.) cooled at 10° C. (bath temperature). After stirring during two hours, the reaction mixture is poured on ice, extracted with ether, dried over magnesium sulfate, filtered and evaporated to dryness. The crude residue is dissolved in ether and extracted with an aqueous basic solution (NaOH, 0.2 N). The basic extract is acidified (HCl) and extracted with ether. The ether solution is dried over magnesium sulfate, filtered and evaporated to dryness to yield an oil. This oil is recrystallized from water-methanol to yield the title compound (VIII) as a solid, m.p. 80–83° C. Sublimation (100–125° C., 0.1 mm.) of a portion of this solid gives a highly purified sample of the title compound, m.p. 85–88° C.

EXAMPLE 8

Tricyclo[4.4.0.0$^{3.8}$]decanylmethylketone (IX)

To a solution of tricyclo[4.4.0.0$^{3.8}$]decane-1-carboxylic acid (VIII, 3.0 g.) in 120 ml. of ether, a solution of methyl lithium (prepared by mixing 1.5 g. of lithium in 45 ml. of ether and 15.0 g. of methyl bromide in 45 ml. of ether) is added. The reaction mixture is refluxed for three hours, then quenched in water and the ethereal layer separated. The ether layer is dried over magnsium sulfate, filtered, and concentrated to dryness to afford the title compound (IX) as an oil $\gamma_{max.}^{NaCl}$ 1700 cm.$^{-1}$. This oil may be used without further purification for the preparation of the corresponding oxime (see Example 9).

EXAMPLE 9

Tricyclo[4.4.0.0$^{3.8}$]decanylmethylketone oxime (X)

A mixture of tricyclo[4.4.0.0$^{3.8}$]decanylmethylketone (IX, 0.6 g.), sodium acetate (6.3 g.) and hydroxylamine hydrochloride (4.2 g.) is refluxed for six hours. The solvent is evaporated and the residue distributed between water and ether. The ether extract is separated, dried over magnesium sulfate, filtered and evaporated under reduced pressure. The residue is crystallized from petroleum ether to yield the title compound (X), m.p. 151–152° C.

EXAMPLE 10

α-Methyltricyclo[4.4.0.0$^{3.8}$]decan-1-methylamine
(I,Q=CH(CH$_3$)NH$_2$)

A solution of tricyclo[4.4.0.0$^{3.8}$]decanylmethylketone oxime (X, 722 mg.) in 25 ml. of ethanol, saturated with gaseous ammonia, is mixed with 200 mg. of Raney nickel and subjected to 1000 lbs./sq. in. of hydrogen at 50° C. in a sealed vessel for four hours. The reaction mixture is filtered and evaporated to dryness to yield the title compound as an oil, γ DMSO 7.88 (NH$_2$, unresolved multiplet).

The hydrochloride salt of the title compound is prepared by treating a solution of the above crude product in ether with excess dry hydrogen chloride in ether. The resulting precipitate is collected and recrystallized from methanol-ether (1:70) to give the hydrochloride salt of the title compound, m.p. 315–320° C. (subl.).

I claim:

1. A compound selected from the group which consists of α-methyltricyclo[4.4.0.0$^{3.8}$]decan-1-methylamine, and non-toxic pharmaceutically acceptable acid addition salts thereof.

2. α-Methyltricyclo[4.4.0.0$^{3.8}$]decan-1-methylamine, as claimed in Claim 1.

3. The hydrochloride salt of α - methyltricyclo-[4.4.0.0$^{3.8}$]decan-1-methylamine, as claimed in Claim 1.

References Cited
UNITED STATES PATENTS

| 2,635,979 | 4/1953 | Lidon | 260—563 |
| 3,439,102 | 4/1969 | Chow | 424—325 |

OTHER REFERENCES

Belanger et al., "Canadian Jour. of Chem.," vol. 47, pp. 795–802 (1969).

Gauthier et al., "Canadian Journal of Chem.," vol. 45, pp. 297–300 (1967).

ROBERT V. HINES, Primary Examiner

U.S. Cl. X.R.

260—327 M, 488 R, 501.1, 501.21, 514 G, 561 R, 566 A, 586 R, 617 F; 424—325